United States Patent [19]
Xue et al.

[11] Patent Number: 6,061,655
[45] Date of Patent: May 9, 2000

[54] METHOD AND APPARATUS FOR DUAL OUTPUT INTERFACE CONTROL OF AUDIO DECODER

[75] Inventors: Ning Xue, Fremont, Calif.; Takumi Nagasako, Tokyo, Japan

[73] Assignee: LSI Logic Corporation, Milpitas, Calif.

[21] Appl. No.: 09/105,720

[22] Filed: Jun. 26, 1998

[51] Int. Cl.[7] .................................................. G10L 3/02
[52] U.S. Cl. .......................................... 704/500; 704/212
[58] Field of Search .................................. 704/212, 500, 704/200, 201, 229; 375/242

[56] References Cited

U.S. PATENT DOCUMENTS

| | | | |
|---|---|---|---|
| 5,528,527 | 6/1996 | Iwata et al. | 364/724.13 |
| 5,630,033 | 5/1997 | Purcell et al. | 345/418 |
| 5,644,310 | 7/1997 | Laczko, Sr. et al. | |
| 5,661,478 | 8/1997 | Matsushige | 341/61 |
| 5,696,708 | 12/1997 | Leung | 364/724.1 |
| 5,719,571 | 2/1998 | Akune et al. | 341/61 |
| 5,802,385 | 9/1998 | Densham et al. | 395/800.16 |
| 5,809,245 | 9/1998 | Zenda | 395/200.47 |
| 5,835,793 | 11/1998 | Li et al. | 395/898 |
| 5,860,060 | 11/1998 | Li et al. | 395/898 |
| 5,889,515 | 3/1999 | McDade et al. | 345/302 |
| 5,931,934 | 8/1999 | Li et al. | 710/260 |
| 5,946,352 | 8/1999 | Rowlands et al. | 375/242 |
| 5,956,674 | 9/1999 | Smyth et al. | 704/229 |

*Primary Examiner*—Richemond Dorvil
*Attorney, Agent, or Firm*—Conley, Rose & Tayon, PC; B. Noel Kivlin

[57] ABSTRACT

An audio decoder is described that can concurrently produce two synchronized outputs of a digital audio stream at different sampling rates and can provide for seamless switching between the rates. In one embodiment, the audio decoder includes a first output buffer, an arithmetic logic unit (ALU), a second output buffer, and a control module. The first audio buffer is configured to buffer a sequence of digital audio samples and to provide the first sequence of digital audio samples to an output device at 96 kHz. The arithmetic logic unit (ALU) is coupled to the first output buffer to retrieve the first sequence of digital audio samples and to convert the first sequence of digital audio samples into a decimated sequence of digital audio samples. The second output buffer is coupled to the ALU to buffer the decimated sequence of digital audio and to provide the decimated sequence of digital audio samples to a second output device at 48 kHz. The control module receives a sample request signal at 96 kHz and responsively provides first and second address signals to the first and second output buffers, respectively, to indicate which digital audio samples are next provided to the output devices. In one implementation of this, the control module implements a first state machine to determine the first address signal and a second, separate state machine to determine the second address signal. This advantageously maintains close synchronization between the two output streams with minimal hardware requirements.

18 Claims, 9 Drawing Sheets

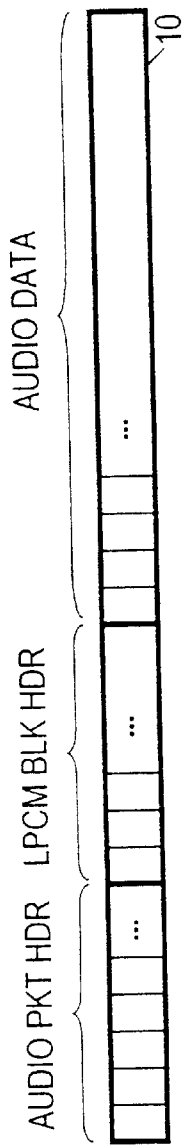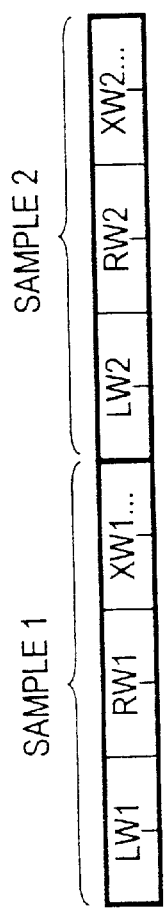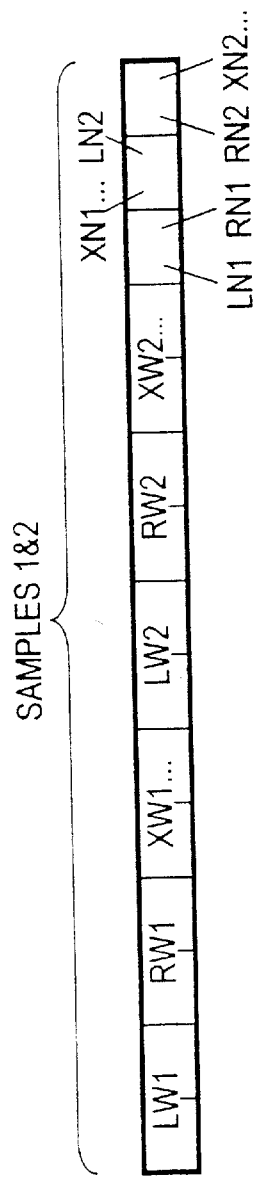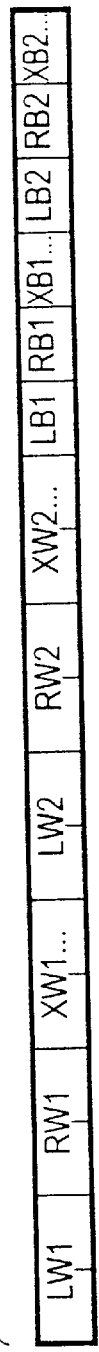
FIG. 1A (PRIOR ART)
FIG. 1B (PRIOR ART)
FIG. 1C (PRIOR ART)
FIG. 1D (PRIOR ART)

METHOD AND APPARATUS FOR DUAL OUTPUT INTERFACE CONTROL OF AUDIO DECODER

RELATED APPLICATIONS

This application is related to U.S. patent application Ser. No. 09/105,719 entitled "Arithmetic logic unit controller for linear PCM scaling and decimation in an audio decoder" by Ning Xue and Takumi Nagasako, and U.S. patent application Ser. No. 09/105,718 entitled "Method for decompressing linear PCM and AC3 encoded audio gain value" by Arvind Patwardhan, Ning Xue and Takumi Nagasako, both of which are filed concurrently herewith and incorporated by reference.

BACKGROUND OF THE INVENTION

1. Field of the Invention

This invention relates to the field of digital audio signal reproduction, and in particular to an audio decoder having a high-sampling rate output interface and a decimated sampling rate output interface which operate concurrently.

2. Description of the Related Art

Sound reproduction is ultimately accomplished by applying an analog signal to a sound transducer. As the sound transducer is typically a separate component, the final stage of any digital audio reproduction device comprises a digital-to-analog converter, a smoothing filter, an amplifier stage, and sometimes an equalizer stage. The digital-to-analog converter accepts digital audio samples of a given resolution (i.e. bit-width), and converts them into analog signal values that are then smoothed and amplified by the remaining stages.

Consider a system which comprises a digital audio reproduction device and a special-purpose digital audio processing device. One example of such a system might be a DVD multimedia playback system and a high-end stereo system equalizer. Since the second device is capable of operating on the digital audio samples available within the first device, it is desirable for the first device to provide access to the digital audio samples even as the first device provides an analog output signal. Before discussing this further, background information on input and output standards is first presented.

A linear pulse code modulation (LPCM) standard for encoded audio programs has been defined within the DVD multimedia standard that allows for audio sampling frequencies of 48 kHz and 96 kHz. The DVD standard is a complex one, but in essence a DVD bitstream consists of packets from various interleaved substreams. Each packet includes a packet header identifying the substream to which the packet belongs and the type of data carried by the packet. Packets which belong to an audio substream and carry linear PCM data further include a linear PCM block header carrying parameters for use by an LPCM audio decoder (e.g. gain, number of channels, bit width of audio samples), and a block of audio data, as shown by packet 10 in FIG. 1A. The format of the audio data in the block is dependent on the bit-width of the samples. FIG. 1B shows how the audio samples in the audio data payload may be stored for 16-bit samples. In this example, the 16-bit samples made in a given time instant are stored as left (LW) and right (RW), followed by samples for any other channels (XW). Allowances are made for up to 8 channels. FIG. 1C shows how the audio samples in the audio data payload are stored for 20-bit samples. In this example, byte-alignment is preserved by grouping sample times into pairs. The most significant 16 bits for samples in the paired time instants are stored in the same manner as before. The remaining nibbles are grouped together following the 16-bit words. The nibbles are packed in the same order as the previous portions of the samples, i.e. LN1,RN1,XN1,LN2,RN2,XN2. FIG. 1D shows how the audio samples in the audio data payload are stored for 24-bit samples. In this example, the portions of the audio samples are ordered in the same manner as FIG. 1C. The primary difference is that the remaining portions (4-bit nibbles in the previous example) are now 8-bit bytes.

IEC 958 is another international standard has been defined for digital audio communications between electronic components at 48 kHz. IEC 958 (published 1989) is a serial, unidirectional, self-clocking interface for interconnecting digital audio equipment. It employs bi-phase mark channel coding and a framing protocol in which each frame corresponds to an audio sampling time instant. Each frame consists of a subframe for each channel, and each sub-frame carries a single audio sample preceded by a synchronization preamble and followed by status flags and a parity bit.

Many high-end digital-to-analog converters (DACs) can operate at sampling frequencies of 96 kHz, and whenever possible, it is preferable to operate at this higher frequency due to the improved sound quality. However, the sampling frequency specified for an IEC 958 output port is 48 kHz. It is desirable for an audio decoder to simultaneously provide a 96 kHz decoded digital output sequence and a 48 kHz decoded digital output sequence when presented with a 96 kHz encoded audio signal in order to support both a high end DAC and an IEC 958 interface. It is further desirable to provide the two output sequences with a minimal time offset so as to avoid humanly-perceptible delays between reproduced audio signals from the two sequences.

SUMMARY OF THE INVENTION

Accordingly, there is provided herein an audio decoder which can concurrently provide two synchronized outputs of a digital audio stream at different sampling rates. In one embodiment, the audio decoder includes a first output buffer, an arithmetic logic unit (ALU), a second output buffer, and a control module. The first audio buffer is configured to buffer a sequence of digital audio samples and to provide the first sequence of digital audio samples to an output device at 96 kHz. The arithmetic logic unit (ALU) is coupled to the first output buffer to retrieve the first sequence of digital audio samples and to convert the first sequence of digital audio samples into a decimated sequence of digital audio samples. The second output buffer is coupled to the ALU to buffer the decimated sequence of digital audio and to provide the decimated sequence of digital audio samples to a second output device at 48 kHz. The control module receives a sample request signal at 96 kHz and responsively provides first and second address signals to the first and second output buffers, respectively, to indicate which digital audio samples are next provided to the output devices. In one implementation of this, the control module implements a first state machine to determine the first address signal and a second, separate state machine to determine the second address signal. This advantageously maintains close synchronization between the two output streams with minimal hardware requirements.

BRIEF DESCRIPTION OF THE DRAWINGS

Other objects and advantages of the invention will become apparent upon reading the following detailed description and upon reference to the accompanying drawings in which:

FIGS. 1A to 1D show examples of an LPCM formatted data packet;

Figure 2:
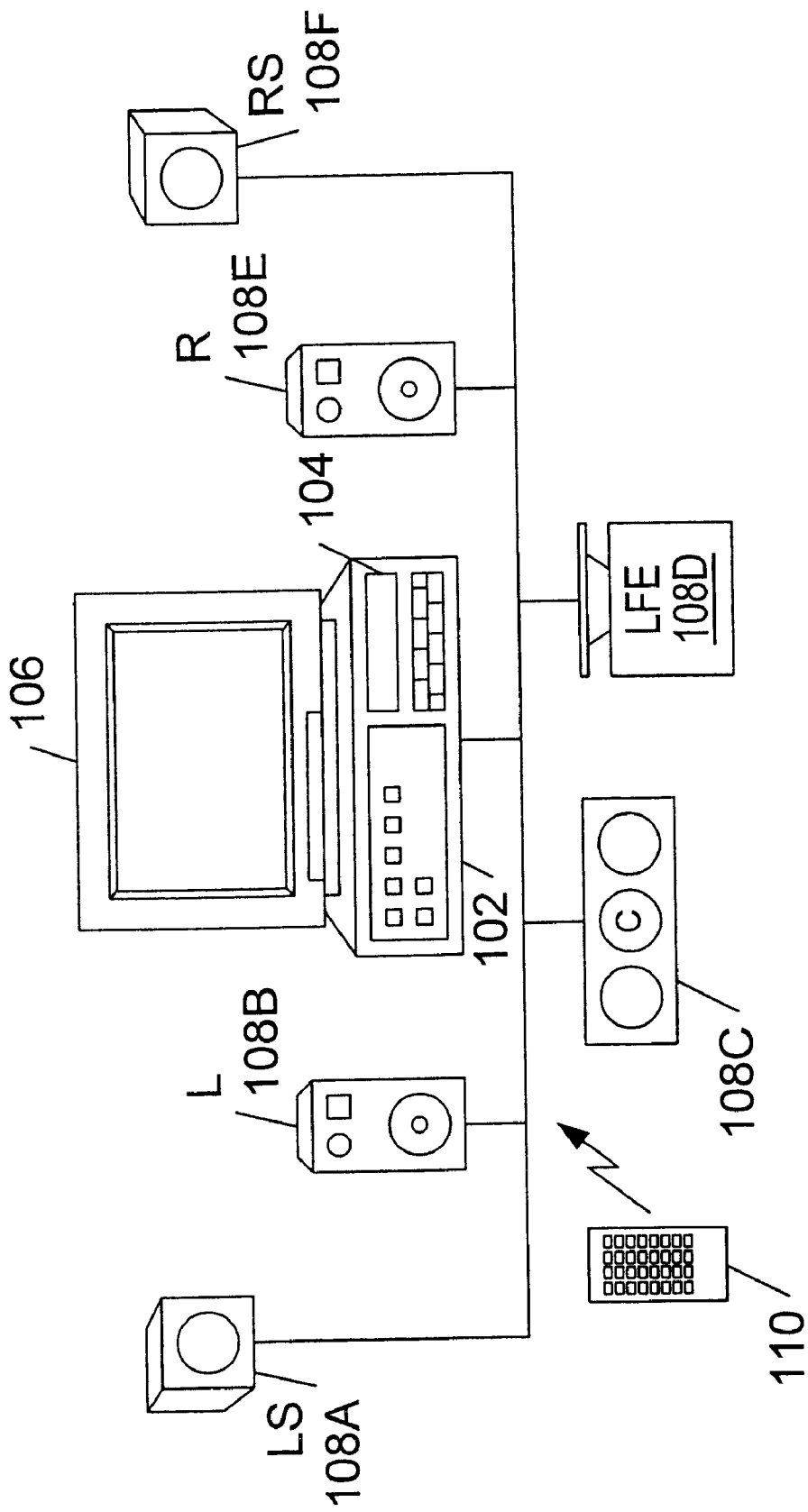
FIG. 2 shows a multimedia system which includes a multi-channel audio subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 2 shows a video playback device 102 which includes a multimedia disc drive 104, is coupled to a display monitor 106 and a set of speakers 108, and which may be controlled via a remote control 110. Video playback device 102 includes a multimedia decoder which advantageously provides configurable, high-quality analog audio output while simultaneously supporting an IEC 958 interface for transmitting digital audio output to other system components (not shown). The device 102 accepts multimedia discs in drive 104, and can read compressed multimedia bitstreams from the multimedia disc. The device 102 can convert the multimedia bitstreams into audio and video signals and present the video signal on display monitor 106 and the audio signals on speaker set 108.

Examples of display monitors 106 include: televisions, computer monitors, LCD/LED flat panel displays, and projection systems. The speaker set 108 may exist in various configurations. A single center speaker 108C may be provided. Alternatively, a pair of left and right speakers 108B, 108E may be provided and used alone or in conjunction with a center speaker 108C. Four speakers, 108B, 108C, 108E, 108F may be provided in a left, center, right, surround configuration, or five speakers 108A, 108B, 108C, 108E, 108F may be provided in a left surround, left, center, right, right surround configuration. Additionally, a low-frequency speaker 108D may be provided in conjunction with any of the above configurations.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 may also be configured to write multimedia bitstreams, and may additionally be configured to write audio programs. The drive 104 includes a multimedia decoder which converts read multimedia bitstreams into video displays and audio programs. The drive 104 may also include a multimedia encoder for converting video displays and audio programs into a multimedia bitstream. A user can instruct the device 102 to forward any received video displays and audio programs directly to the display monitor 106 and speaker set 108 for display and audio playback.

Figure 3:
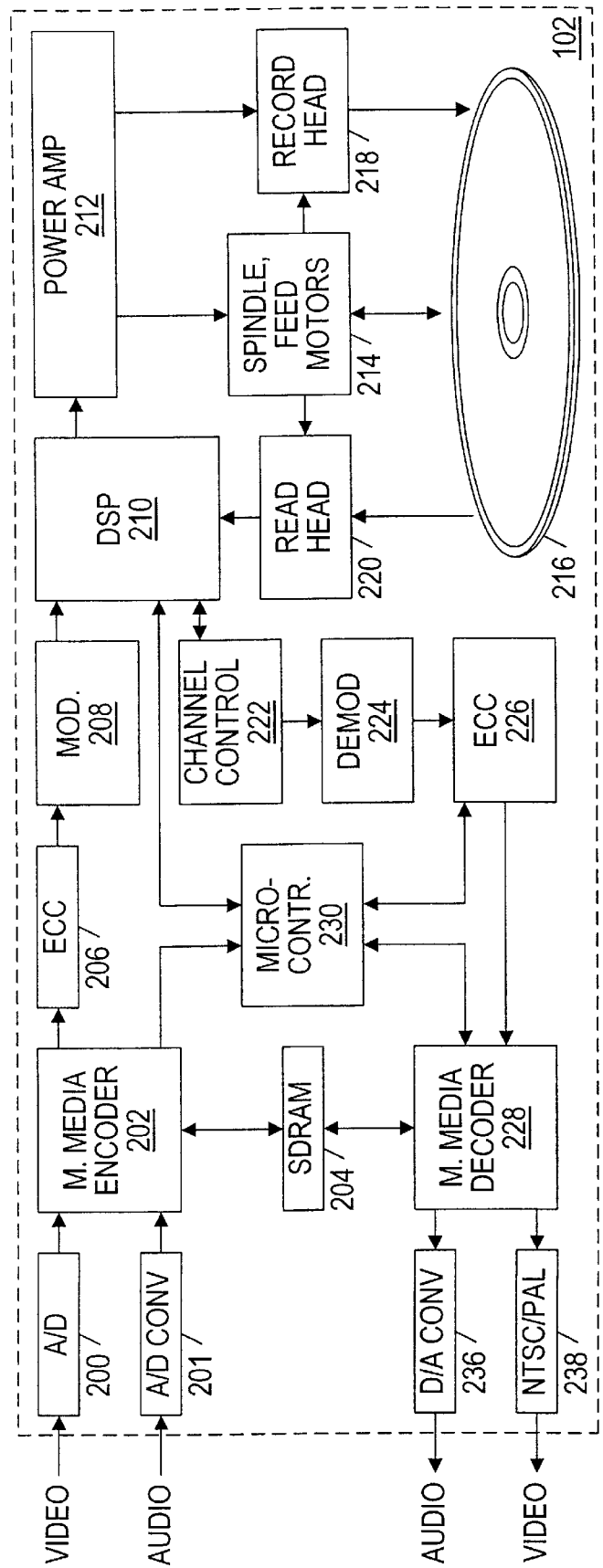
FIG. 3 shows a functional block diagram of a multimedia recording and playback device.

Turning now to FIG. 3, a functional block diagram of one embodiment of a video recording and playback device 102 is shown. The device 102 provides audio and video signals to the display monitor 106, and can accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens. Some of the various components are now described in greater detail.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used, including MPEG and DVD.

In one embodiment, the general nature of the video compression performed by multimedia encoder 202 is MPEG encoding. The video compression may include sub-sampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zigzag reordering of transform coefficients followed by run length and Huffman encoding of the transform coefficients. The interframe compression is performed by additionally using motion estimation, predictive coding, and coefficient quantization.

In one embodiment, the general nature of the audio compression performed by multimedia encoder 202 is MPEG-2/AC-3 encoding. The audio compression may include locking the input sampling rate to the output bit rate, sample rate conversion, input filtering, transient detection, windowing, time-to-frequency domain transformation, channel coupling, rematrixing, exponent extraction, dithering, encoding of exponents, mantissa normalization, bit allocation, quantization of mantissas, and packing of audio frames, e.g. for AC-3 encoding. Similarly, the audio compression may include filter bank synthesis, calculation of signal to noise ratio, bit or noise allocation for audio samples, scale factor calculation, sample quantization, and formatting of the output bitstream, e.g. for MPEG-2 encoding. For either method, the audio compression may further include subsampling of low frequency signals, adaptation of frequency selectivity, and error correction coding.

In another embodiment, audio compression may not be employed, and the audio channels may be formatted as a linear pulse-code modulation (LPCM) bitstream. In this form, the audio signals are sampled at 48 or 96 kHz and the samples are packed into audio data blocks and provided with a packet header to form audio substream packets.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signals and video signals. The operation and structure of multimedia decoder 228 are discussed further below. The digital audio signal and video signals may be converted to analog audio and video signals before being sent to display monitor 106.

Figure 4:
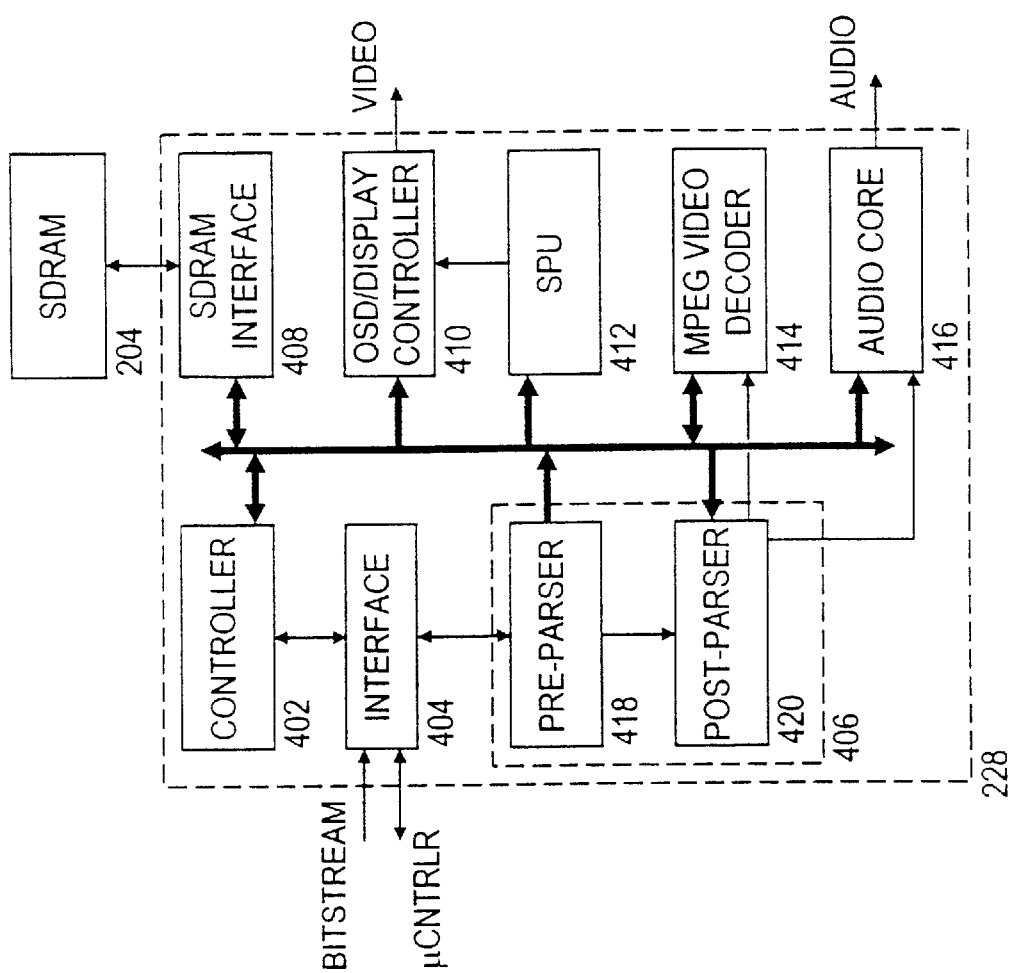
FIG. 4 shows a block diagram of a multimedia bitstream decoder.

Turning now to FIG. 4, a block diagram of one embodiment of multimedia decoder 228 is shown. Multimedia decoder 228 comprises a controller 402, a host interface 404, a variable length decoder (VLD) 406, a memory interface 408, a display controller 410, a sub-picture unit (SPU) 412, an MPEG video decoder 414, and an audio core 416. VLD 406 includes a pre-parser 418 and a post-parser 420. Controller 402 is coupled to the rest of the modules of multimedia decoder 228 to configure their behavior by setting various configuration registers and to monitor their performance. Controller 402 may also transmit status and request information to an external microcontroller 230. Host interface 404 is coupled to controller 402 and VLD 406, and is configured to receive an encoded multimedia bitstream and to communicate with an external microcontroller 230. Various operating instructions (e.g. reset, begin decode, playback mode) may be provided by external microcontroller 230 to controller 402 via host interface 404. Other operating instructions may be found in the encoded multimedia bitstream and provided to controller 402 (e.g. navigation commands).

VLD decoder 406 receives the encoded multimedia bitstream from host interface 404 and parses the encoded multimedia bitstream. Pre-parser 418 determines the substream membership of each data packet from the packet header and routes the packet contents (minus identifying fields from the packet header) to the appropriate elementary bitstream buffer in memory 204, where they wait on the availability of the associated module to begin being processed. Uncompressed data packets are retrieved directly from the appropriate buffer in memory 204 by the associated module. However, many of these data packets have variable-length encoded data (e.g. compressed audio and video). These data packets are passed to the associated module via post-parser 420. Post-parser 420 parses the bitstream syntax and performs elementary operations such as extracting the bit allocation and scaling information from the headers, and applying that information to convert the variable-length encoded data into fixed-length transform coefficients for subsequent modules to process.

Memory interface 408 acts as a bus arbiter and provides access to memory 204 for the other modules. Display controller 410 retrieves decoded digital video data from a buffer in memory 204 and provides it in raster order as a digital video output. Display controller 410 may incorporate an on-screen display (OSD) unit that can overlay system information on the video image, e.g. configuration menus, time, channel, volume, etc. Display controller 410 may also be coupled to overlay bitmap signals from other modules onto the video image. SPU controller 412 retrieves bitstream information from an SPU buffer in memory 204, decodes it into bitmap information, and provides the resulting bitmap to display controller 410 for possible display.

Video decoder 414 receives variable-length decoded transform coefficients from post-parser 420 and decodes them to generate decoded video data. The decoding process typically involves reference to anchor frames stored in frame buffers in memory 204. Video decoder 414 retrieves anchor frame data from the frame buffers and writes the decoded video data to anchor frame buffers or to intermediate buffers from which it is retrieved by display controller 410 for display.

Audio decoder 416 receives variable length decoded transform coefficients from post-parser 420 (in the case of compressed audio) or directly from memory 204 (in the case of LPCM audio data). Audio decoder 416 is configurable to convert transform coefficients into digital audio samples, and is also configurable to re-assemble LPCM audio data into digital audio samples.

Figure 5:
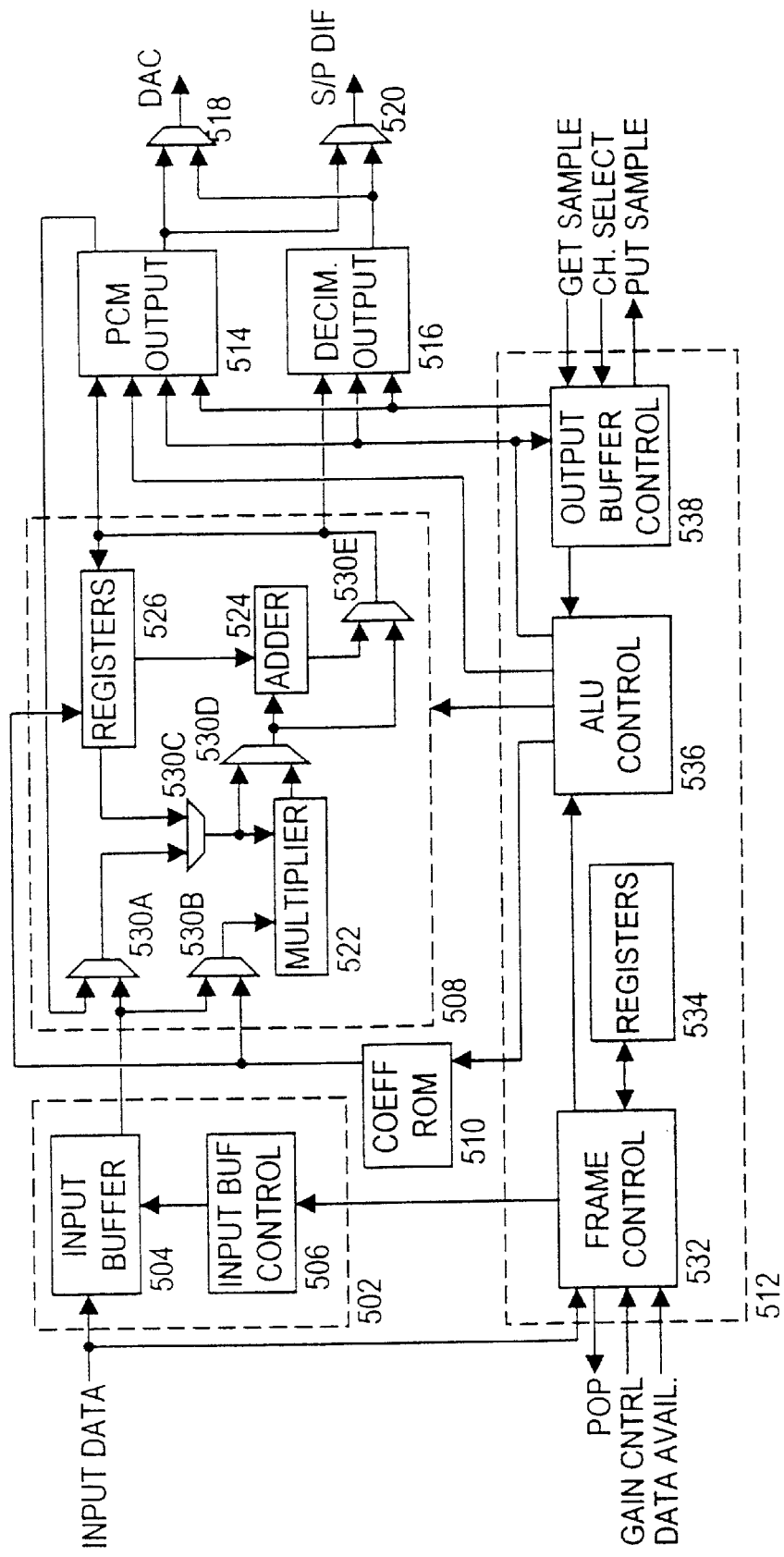
FIG. 5 shows a block diagram of an audio decoder.

FIG. 5 shows one embodiment of audio decoder 416 comprising an input interface 502, an arithmetic logic unit (ALU) 508, a coefficient memory 510, a control module 512, a PCM output buffer 514, and a decimation output buffer 516. Multiplexers 518 and 520 are shown for explanatory purposes and may not necessarily be present in a final product. Input interface 502 includes an input buffer 504 and an input buffer controller 506. ALU 508 includes a multiplier 522, an adder 524, a set of registers 526, and routing multiplexers 530A, 530B, 530C, 530D, and 530E. Control module 512 includes frame control logic 532, configuration registers 534, ALU control logic 536, and output buffer controller 538. Depending on the elementary bitstream format, data is retrieved by input interface 502 directly from the audio elementary bitstream buffer in memory 204, or is retrieved from the audio elementary bitstream buffer via post-parser 420. Direct retrieval is used for the LPCM case, whereas the post-parser 420 is used to perform variable-length decoding of encoded audio data.

For MPEG and AC-3 audio data, the data initially held in input buffer 504 is a set of transform coefficients. The transform coefficients are retrieved from input buffer 504 by ALU 508 under the control of control module 512. The transform coefficients are provided in blocks, each block representing the audio samples of one audio channel in one audio frame. Under control of control module 512, the ALU 508 operates on the transform coefficients to transform, window, and downmix data to produce the desired audio output. The control module 512 operates according to configuration registers 534. Control module 512 uses coefficients stored in coefficient memory 510 to perform the inverse transformation, and subsequently changes mode to perform the windowing and downmix operations.

For linear PCM audio data, the necessary decoding operations may include searching for a synchronization word, calculating scale values, combining bytes and nibbles with words to reconstruct full-resolution data samples, scaling the data samples to generate the output digital audio samples, and decimating the output digital audio sequences. To provide audio decoder 416 with each mode and the ability to conduct each operation, control module 512 implements corresponding state-transition diagrams. The ensuing discussion concerns the behavior of the various audio decoder components when processing linear PCM audio data.

In the embodiment of FIG. 5, the control module 512 is divided into frame control logic 532, ALU control logic 536, and output buffer control logic 538. Frame control logic 532 operates in conjunction with input interface 502 to extract parameters and audio data from the input data stream. The input data stream is coupled to both the input buffer 504 and the frame control logic 532. The frame control logic 532 is further coupled to receive a gain control signal and a data available signal. When the audio decoder is ready to receive data and data is available (i.e. the input buffer is not full and the data available signal is asserted), frame control logic 532 asserts a POP signal to request delivery of the next byte. Each linear PCM data block is delivered a byte at a time, beginning with the linear PCM block header. The header parameters (including sample bit-width, number of channels, and encoded gain value) are extracted by frame control logic, and the audio data is processed by the input interface 502. A synchronization word may be provided at the beginning of each linear PCM block header to be checked for and searched for by the frame control logic 532 in the event a loss of synchronization is detected.

The gain control signal may be used to modify the encoded gain value should the user desire to modify the amount of emphasis and/or de-emphasis being applied to symbols by the ALU. In one embodiment, the frame control logic forwards the gain control signal with the encoded gain value to the ALU control logic 536.

Input buffer controller 506 operates to unpack the audio samples in the audio data block. As seen in FIG. 1, audio data samples of 20 and 24 bits must be re-assembled by appending nibbles and bytes, respectively, to 16-bit words, and this task is directed by the buffer controller 506. The re-assembled audio data samples are provided to ALU 508.

ALU 508 can operate on audio data samples provided from the input buffer 526 and from the PCM output buffer 514, as well as on data values stored in internal registers 526. The internal resolution of ALU may be greater than that of the input and output data values. In one implementation, the ALU components provide for up to 33 bits of resolution, and all output values are rounded to 24 bits. Routing multiplexers 530 are configured so that multiplier 522 can multiply audio samples from input buffer 504 by a gain value stored in registers 526, and can also multiply output audio samples from PCM buffer 514 by filter coefficients from coefficient memory 510. Routing multiplexers 530 are further configured so that adder 524 can add the output of multiplier 522 to a value from registers 526. Finally, routing multiplexers 530 are further configured to allow an input value, a multiplier output value, or an adder output value to be stored in registers 526 or provided as output to PCM buffer 514 or decimation buffer 516.

ALU control logic 536 governs the operation of ALU 508 to conduct a determination of a gain value, to scale all the input audio samples by the gain value to produce output audio samples, and to decimate the output audio samples to produce decimated audio samples at a reduced sampling frequency. ALU control logic 536 further provides control signals to the output buffers 514, 516, and to coefficient memory 510. The operation of the ALU control logic 536 is discussed further below.

PCM output buffer 514 receives output audio samples from ALU 508, a write address and write enable signal from ALU control logic 536, a read address signal from ALU control logic 536, and another read address signal from output buffer control logic 538. Decimation output buffer 516 similarly receives decimated output audio samples from ALU 508, a write address and write enable signal from ALU control logic 536, and a read address signal from output buffer control logic 538. In response to the write enable and write address signals, the output buffers 514, 516 store output samples from ALU 508 in the indicated location of the appropriate buffer. In response to the read address signals from the output buffer control logic 538, the output buffers 514, 516 provide the output sample from the indicated location to multiplexers 518, 520. In response to the read address signal from the ALU control logic 536, PCM output buffer 514 provides the output sample from the indicated location to ALU 508.

Multiplexers 518, 520 are shown for explanatory purposes to illustrate the ability to provide output samples from either buffer to both the DAC and the S/P DIF (Sony/Philips Digital InterFace—an IEC 958 protocol transmitter). In one embodiment, this ability is provided by a time-multiplexed bus to which the output buffers 514, 516 and the DAC and S/P DIF are connected.

Output buffer control logic 538 receives a channel select signal and a sample request signal, and responsively provides a sample available signal to the DAC and S/P DIF. The output buffer control logic 538 further receives the write enable signals from ALU control logic 536, and responsively provides output buffer status signals to ALU control logic 536 and read address signals to output buffers 514, 516. The output buffer control logic 536 configuration is described further below.

In the following figures showing state-transition diagrams, many of the transitions are labeled. A colon (:) is used to separate transition triggers (i.e. inputs) from transition results (i.e. outputs). Signals which precede the colon reflect input conditions which cause the transition, and signals which follow the colon reflect output conditions which result from the transition.

Figure 6:
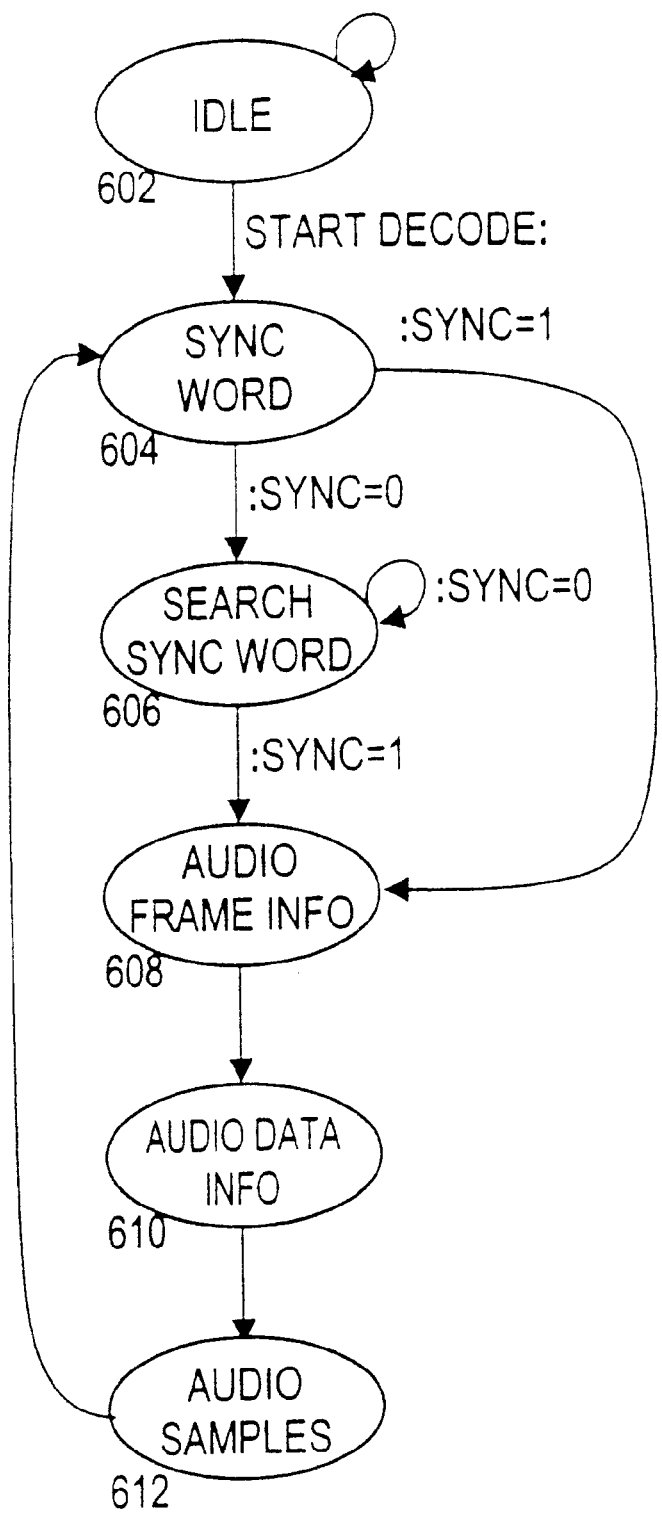
FIG. 6 shows a state transition diagram which may be implemented by a frame controller.

FIG. 6 shows a high level state-transition diagram which may be implemented by frame control logic 532 during decoding of incoming linear PCM audio data. It includes idle state 602, sync word detect state 604, sync word search state 606, audio frame information retrieval state 608, audio data information retrieval state 610, and audio sample reconstruction state 612. When multimedia decoder 228 begins receiving a program bitstream with linear PCM audio data, a start decode signal is asserted, and frame control logic 532 enters sync word detect state 604. If the incoming input data bytes equal the synchronization word marking the beginning of an linear PCM audio block, a SYNC signal is asserted and frame control logic 532 enters state 608. Otherwise, the SYNC signal is de-asserted, and frame control logic 532 enters sync word search state 606. In state 606, frame control logic 532 conducts a byte-by-byte search for the synchronization word until one is found, at which point the SYNC signal is asserted, and frame control logic 532 enters state 608. In state 608, frame control logic 532 retrieves frame information from header fields such as the emphasis flag, mute flag, and frame number. Then, in state 610, frame control logic 532 retrieves audio data information from header fields such as quantization word length (sample bit-width), sampling frequency, number of input audio data bytes, and scale factor (encoded gain value). The sample bit-width is provided to input buffer controller 506, and the encoded gain value is provided to ALU control logic 536. The number of input bytes is used by the frame control logic 532 to retrieve input samples for the input buffer 504 in state 612. After all the audio samples have been retrieved, or when an error occurs, the frame control logic returns to sync word detect state 604.

One of the operations of ALU control logic is a determination of a gain value. After the gain value G is determined, all the input audio samples I are scaled by the gain value:

$$O_i = G \times I_i.$$

To conserve bits in the linear PCM data stream, the gain value is provided in logarithmic form in the linear PCM header. A range control byte consisting of a 3-bit value X and a 5-bit value Y can be used to determine the gain control value G according to the following formula:

$$G = 2^{4-X-(Y/30)}.$$

Writing the binary representation of Y as $y_4 y_3 y_2 y_1 y_0$, where $y_i$ represents the bit in the ith significant place, $y_0$ being the least significant bit, then Y equals $y_0 + 2y_1 + 4y_2 + 8y_3 + 16y_4$, and the gain control value can be calculated as the product of the following bracketed factors:

$$G = [2^{4-X}][(2^{-1/30})^{y_0}][(2^{-1/30})^{2y_1+4y_2}][(2^{-1/30})^{8y_3+16y_4}]$$

Writing the gain formula in this form allows the gain control value to be calculated with at most two multiplications and a single shift operation, and requires the storage of only seven pre-calculated factors. Representing $2^{-1/30}$ momentarily as A, the required pre-calculated factors would be A, $A^2$, $A^4$, $A^6$, $A^8$, $A^{16}$, and $A^{24}$.

Figure 7:
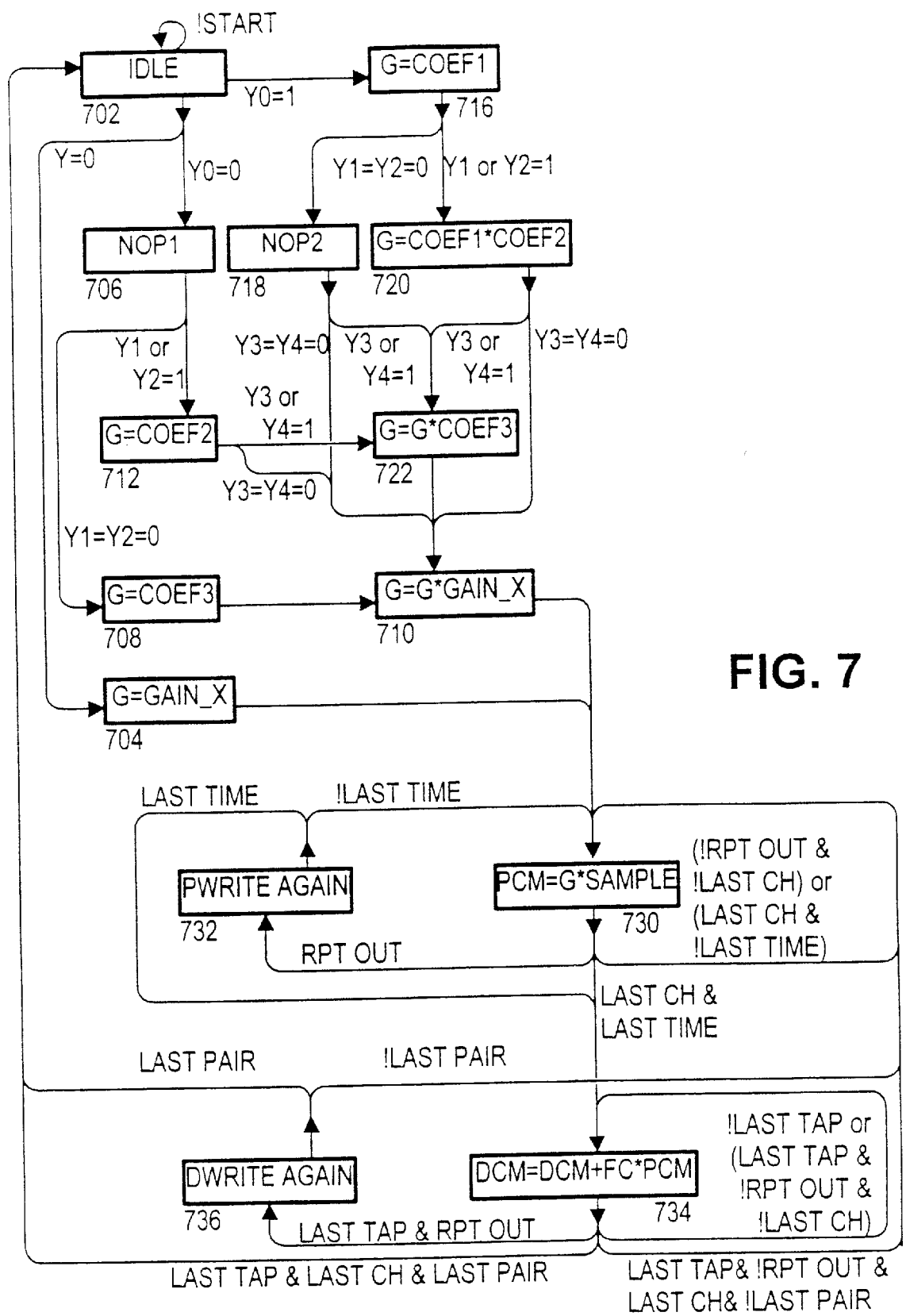
FIG. 7 shows a state transition diagram which may be implemented by an ALU controller.

FIG. 7 shows a high level state transition diagram which may be implemented by ALU control logic 536. It comprises idle state 702, load X state 704, first decision state 706, load coefficient3 state 708, shift state 710, load coefficient2 state 712, load coefficient1 state 716, second decision state 718, first multiply state 720, second multiply state 722, scale state 730, PCM repeat state 732, decimation state 734, and decimation repeat state 736. As the frame control logic 532 begins processing a linear PCM audio block, it provides the range control byte to ALU control logic 536. The ALU control logic 536 then performs two tests and exits the idle state 702. The first test is whether Y=0. If Y=0, the ALU control logic enters load X state 704. The second test is whether $y_0 = 1$. If so, the ALU control logic enters load coefficient1 state 716. If both tests are false, the ALU control logic enters first decision state 706.

In load X state 704, ALU control logic 536 causes $2^{4-X}$ to be stored in a gain register in registers 526. In one embodiment, coefficient memory 510 includes a shifter, and $2^4$ is retrieved and shifted by X bits in accordance with control signals from control logic 536. The result is then stored in registers 526. Since Y is zero, this completes the gain value calculation.

In first decision state 706, a test is made to determine if $y_1$ or $y_2$ is nonzero. If both are zero, control logic 536 enters load coefficient3 state 708, otherwise it enters load coefficient2 state 712. In load coefficient3 state 708, control logic 536 uses $y_3$ and $y_4$ to determine which pre-calculated factor from coefficient memory 510 to store in registers 526. Depending on $y_3$ and $y_4$, the control logic 536 will store $A^8$, $A^{16}$, or $A^{24}$ in the gain register. From state 708, control logic 536 enters shift state 710. In shift state 710, the product of the gain register value and $2^{4-X}$ is calculated by multiplier 522. In one embodiment, control logic 536 causes coefficient memory to produce the value of $2^{4-X}$ as in step 704, and causes multiplier 522 to multiply the two factors. State 710 completes the gain value calculation.

In load coefficient2 state 712, control logic 536 uses $y_1$ and $y_2$ to determine which pre-calculated factor from coefficient memory 510 to store in registers 526. Depending on $y_1$ and $y_2$, the control logic 536 will store $A^2$, $A^4$, or $A^6$ in the gain register. A test is made to determine if $y_3$ or $y_4$ is nonzero. If both are zero, control logic 536 enters shift state 710. Otherwise, control logic enters second multiply state 722. In second multiply state 722, the product of the gain register value and the third coefficient is calculated by multiplier 522. Control logic 536 uses $y_3$ and $y_4$ to determine which pre-calculated factor from coefficient memory 510 to retrieve as the third coefficient. Depending on $y_3$ and $y_4$, the control logic 536 will provide $A^8$, $A^{16}$, or $A^{24}$ to multiplier 522.

In load coefficient1 state 716, control logic 536 retrieves A from coefficient memory 522 and stores it in the gain register. A test is then performed to determine if $y_1$ or $y_2$ is nonzero. If both are zero, control logic 536 enters the second decision state 718, otherwise it enters the first multiplication state 720. In first multiplication state 720, the product of the gain register value and the second coefficient is calculated by multiplier 522. Control logic 536 uses $y_1$ and $y_2$ to determine which pre-calculated factor from coefficient memory 510 to retrieve as the second coefficient. Depending on $y_1$ and $y_2$, the control logic 536 will provide $A^2$, $A^4$, or $A^6$ to multiplier 522. For both state 718 and 720, a test is made to determine if $y_3$ or $y_4$ is nonzero. If both are zero, control logic 536 enters shift state 710. Otherwise, control logic enters second multiply state 722.

Once the gain value calculation is complete, the ALU control logic 536 begins processing the incoming audio samples. In states 730–736, the following pseudo-code is implemented:

```
FOR EACH PAIR OF TIME INSTANTS IN FRAME
   FOR EACH TIME INSTANT IN TIME-INSTANT PAIR
      SCALE LEFT CHANNEL AUDIO SAMPLE
      WRITE TO PCM BUFFER
      IF MONO INPUT
         REPEAT WRITE TO PCM BUFFER
      ELSE
         SCALE RIGHT CHANNEL AUDIO SAMPLE
         WRITE TO PCM BUFFER
      END
   END
   FOR EACH TAP IN FILTER
      MULTIPLY AND ACCUMULATE LEFT CHANNEL AUDIO
      SAMPLES
   END
   WRITE TO DECIM BUFFER
   IF MONO INPUT
      REPEAT WRITE TO DECIM BUFFER
   ELSE
      FOR EACH TAP IN FILTER
         MULTIPLY & ACCUMULATE RIGHT CHANNEL AUDIO
         SAMPLES
      END
      WRITE TO DECIM BUFFER
   END
END
```

In words, the incoming sampling time instants are grouped into pairs. The time instants' left channel audio sample from each time-instant pair are multiplied by the gain value and written to the PCM output buffer 514. If the input signals are monophonic (only one channel), then the output values are written twice, once for each output channel, otherwise the right channel audio samples are multiplied by the gain value and written to the PCM output buffer 514. After a time-instant pair has been processed, one decimation time-instant is calculated by calculating a weighted sum of left channel audio samples from the PCM output buffer 514. The result is written to the decimation buffer. If the input signals are monophonic, then the result is written twice, once for each output channel, otherwise a weighted sum of right channel audio samples from the PCM output buffer 514 is calculated and written to the decimation buffer.

In scale state 730, ALU control logic 536 directs the multiplier 522 to calculate the product of an input audio data sample and the gain value, and to store the result in the PCM output buffer 514. If the input is monophonic (i.e. the RPT OUT signal is asserted), the ALU control logic enters PCM repeat state 732. If not, the control logic 532 loops in state 730 until both channels of both time instants of a time-instant pair are scaled and written to the PCM output buffer 514 (i.e. until the last channel (LAST CH) of the second time instant (LAST TIME) is scaled), after which control logic 532 enters decimation state 734.

In PCM repeat state 732, the current output value of multiplier 522 is simply written a second time to PCM output buffer 514. If the last sample of the pair is now finished, control logic 536 enters decimation state 734, otherwise it returns to scale state 730. In decimation state 734, control logic 536 loops, multiplying PCM output samples from buffer 514 by filter coefficients from coefficient memory 510 to produce a weighted sum. The accumulated sum is held in registers 526 and added to each subsequent product from multiplier 522 until all the filter tap products have been calculated. The final result is rounded to 24 bits, and written to decimation output buffer 516. If the RPT OUT signal is asserted, control logic 536 moves to decimation repeat state 736 after all tap products have been calculated. Otherwise, control logic 536 repeats the filter looping for the second channel. After both channels have been processed, if the last time-instant pair of the input audio block has already been processed, control logic 536 returns to idle state 702, otherwise it returns to scale state 730.

In decimation repeat state 732, the output value of adder 524 is simply written a second time to the decimation output buffer 516. If the last time-instant pair in the input audio block has been processed, the control module 536 enters idle state 702, otherwise it returns to scale state 730.

Figure 8:
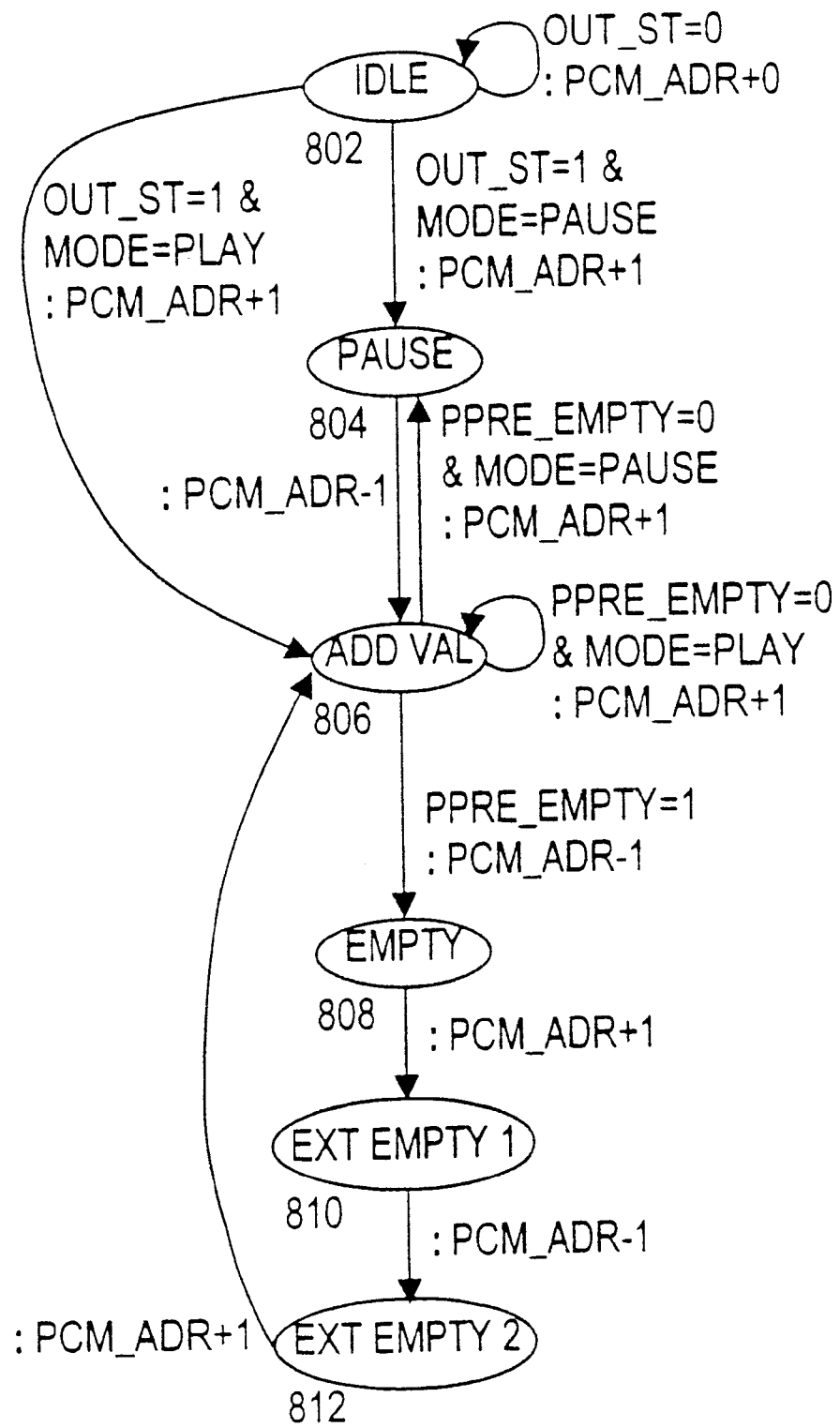
FIG. 8 shows a first state transition diagram which may be implemented by an output buffer controller.

FIG. 8 shows one state transition diagram which may be implemented in one embodiment of output buffer control logic 538. The state transition diagram includes idle state 802, pause state 804, add value state 806, empty state 808, first extended empty state 810, and second extended empty state 812. The output buffer control logic 538 moves through the state transition diagram at a rate determined by the sample request signal. For high-quality PCM output, the sample request signal oscillates at 96 kHz. For normal PCM output, the sample request signal oscillates at 48 kHz. For FIGS. 8 and 9, the ensuing discussion will assume that audio decoder 416 is providing 96 kHz PCM output data and 48 kHz decimated output data. This is for explanatory purposes only, and is not intended to be a limitation.

When the audio decoder output is disabled (OUT_ST=0), control logic 538 simply idles in idle state 802, and the read address of the PCM output buffer 514 is not incremented. When the output is enabled (OUT_ST=1), control logic 538 either enters pause state 804 (if MODE=PAUSE) or enters add value state 806 (if MODE=PLAY), and in both cases, the read address of the PCM output buffer 514 is incremented, causing the next audio sample stored in the PCM output buffer to be driven on the output lines of the PCM output buffer 514. From the pause state 804, the control logic 538 enters add value state 806 and decrements the read address and causing the previous audio sample stored in the PCM output buffer to be driven on the output lines. In the add value state 806, the empty condition of the PCM buffer is tested. The assertion of the PPRE-EMPTY signal is indicative that the last audio sample written to the PCM output buffer 514 is currently being driven on the output lines. If this is not the case, then if in the pause mode, the control logic 538 returns to pause state 804, otherwise it returns to the add value state 806. In both cases, the read address is incremented. If the PPRE-EMPTY signal is asserted, the control logic 538 enters empty state 808 and decrements the read address.

From the empty state 808, the control logic enters the first extended empty state 810 and increments the read address. From extended empty state 810, the control logic 538 enters the second extended empty state 812 and decrements the read address. Finally, from the second extended empty state 812, control logic 538 returns to the add value state 806 and increments the read address. It is noted that this state transition diagram provides for a strict alternation of left and right channel audio output samples.

Figure 9:
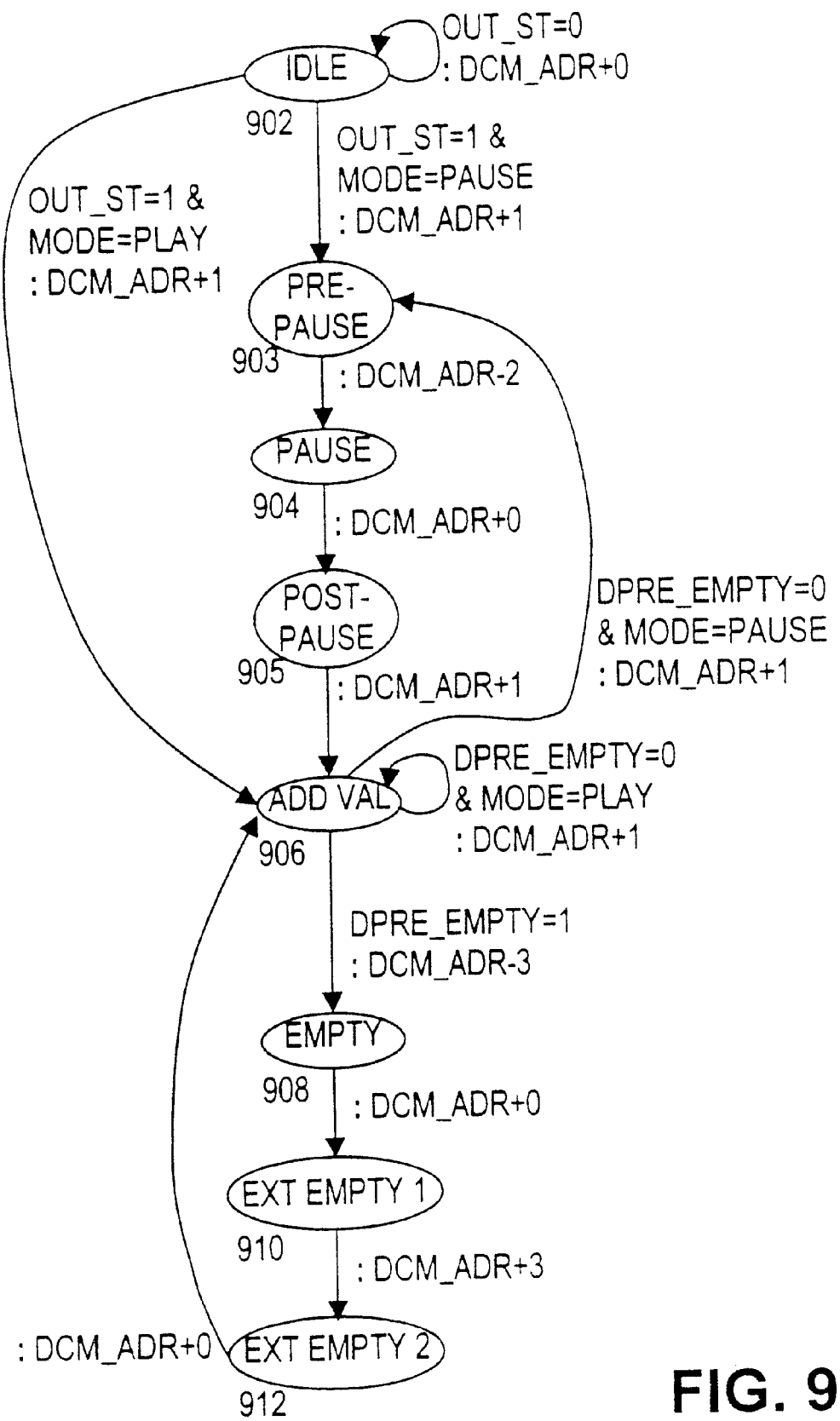
FIG. 9 shows a second state transition diagram which may be implemented by an output buffer controller.

FIG. 9 shows a second state transition diagram which may be implemented in one embodiment of control logic 538. While the read address of the PCM output buffer 514 is governed by the state transition diagram of FIG. 8, the read address of the decimation output buffer 516 is governed by the present state transition diagram. The control logic 538 moves through the present state transition diagram at the same rate as the state transition diagram of FIG. 8. However, since only one audio sample from the decimation buffer is provided for every two audio samples from the PCM audio buffer, the read address for the decimation buffer 516 may be provided with the same resolution and the least significant bit may be ignored by the decimation buffer 516. The following discussion assumes that this is the case.

The state transition diagram of FIG. 9 includes an idle state 902, a pre-pause state 904, a pause state 904, a post pause state 905, an add value state 906, an empty state 908, a first extended empty state 910, and a second extended empty state 912. Much of the operation of this state transition diagram is similar to that of FIG. 8. The pause state 804 is expanded into three states 903, 904, 905. When the pause mode is active in the add value state 906, control logic 538 moves to pre-pause state 903 and increments the read address. From pre-pause state, control logic 538 enters pause state 904 and decrements the read address by 2. From pause state 904, control logic 538 enters post-pause state 905 and freezes the read address. From post-pause state 905, control logic 538 returns to the add value state 906 and increments the read address.

The assertion of the DPRE-EMPTY signal is indicative that the last sample written to the decimation output buffer 516 is being driven on the output lines from the decimation output buffer for the second clock cycle. If the DPRE-EMPTY signal is asserted in the add value state 906, the control logic 538 enters empty state 908 and decrements the read address by 3. From the empty state 908, the control logic 538 enters the first extended empty state 910 and freezes the read address. From the first extended empty state 910, control logic 538 enters the second extended empty state 912 and increments the read address by 3. Finally, from the second extended empty state 912, the control logic 538 freezes the read address and returns to add value state 906. It is noted that the strict alternation of left and right channel output samples is preserved, although it occurs at half the rate of the PCM output samples.

The control logic 538 implementation of the state transition diagrams of FIGS. 8 and 9 is configured to drive both diagrams in synchronization in response to a single PCM sample request signal. This provides numerous advantages over separately controlling the two buffers: The interface to the DAC and S/P DIF can be significantly simplified since only one request/acknowledge data delivery action is needed, the output PCM and decimation sample sequences have a tightly-constrained time discrepancy, and data rate switching is undetectable and readily accomplished.

It is noted that this audio decoder configuration provides for versatility in the output sampling rates. Not all DACs can operate at 96 kHz, so these DACs may be provided with the decimated signal sequence when 96 kHz linear PCM audio packets are provided. Similarly, since decimation is unnecessary when 48 kHz linear PCM audio packets are provided, the IEC 958 interface can be provided with samples from the first output buffer. Furthermore, "hot switching" is easily accommodated, since both outputs are concurrently provided, the user can switch between decimated and undecimated output sequences with no detectable interruption of the audio presentation.

Numerous variations and modifications will become apparent to those skilled in the art once the above disclosure is fully appreciated. It is intended that the following claims be interpreted to embrace all such variations and modifications.

What is claimed is:

1. An audio device which comprises:
    a first output buffer configured to buffer a first sequence of digital audio samples and configured to provide the first sequence of digital audio samples to a first output device for playback at a first sampling frequency;
    an arithmetic logic unit (ALU) coupled to the first output buffer to retrieve the first sequence of digital audio samples and configured to convert the first sequence of digital audio samples into a decimated sequence of digital audio samples;
    a second output buffer coupled to the ALU to buffer the decimated sequence of digital audio and configured to provide the decimated sequence of digital audio samples to a second output device for playback at a reduced sampling frequency; and
    a control module configured to receive a sample request signal and responsively provide first and second address signals to the first and second output buffers, respectively, to indicate which digital audio samples are next provided to the first and second output devices, wherein the control module implements a first state machine to determine the first address signal and a second, separate state machine to determine the second address signal.

2. The audio device of claim 1, wherein the control module is further configured to receive a pause signal, a first buffer empty signal and a second buffer empty signal, wherein the control module enters a normal-play state in the first state machine if the pause signal and the first buffer empty signal are both de-asserted, and wherein the control module enters a normal-play state in the second state machine if the pause signal and the second buffer empty signal are both de-asserted.

3. The audio device of claim 2, wherein in the normal-play mode in the first state machine, the control module increments the first address signal once for each assertion of the request signal.

4. The audio device of claim 3, wherein in the normal-play mode in the second state machine, the control module increments the second address signal once for every-other assertion of the request signal.

5. The audio device of claim 3, wherein the control module enters a sequence of three empty states in the first state machine and returns to the normal play state in the first state machine if the first buffer empty signal is asserted, and wherein the control module alternately decrements and increments the first address signal while the first buffer empty signal is asserted.

6. The audio device of claim 5, wherein the control module enters a pause state in the first state machine if the pause signal is asserted, and wherein the control module alternately increments and decrements the first address signal while the pause signal is asserted.

7. The audio device of claim 5, wherein in the normal-play mode in the second state machine, the control module increments the second address signal once for every-other assertion of the request signal.

8. The audio device of claim 7, wherein the control module enters a sequence of three empty states in the second state machine and returns to the normal play state in the second state machine if the second buffer empty signal is asserted, and wherein the control module alternately decrements and increments the second address signal once for every other assertion of the request signal while the second buffer empty signal is asserted.

9. The audio device of claim 8, wherein the control module enters a sequence of pause states in the second state machine and returns to the normal play state in the second state machine if the pause signal is asserted, and wherein the control module alternately increments and decrements the second address signal once for every other assertion of the request signal while the pause signal is asserted.

10. An audio system which comprises:
    an audio reproduction device configured to produce an audio signal from a first digital sample sequence provided at a first sampling rate;

an audio processing device configured to receive a decimated digital sample sequence at a reduced sampling rate;

an audio decoder which includes:
- a first buffer coupled to the audio reproduction device to provide the first digital sample sequence;
- a second buffer coupled to the audio processing device to provide the decimated digital sample sequence;
- a decimation processor coupled to the first buffer to retrieve the first digital sample sequence and coupled to the second buffer to provide the decimated digital sample sequence; and
- a control module configured to provide first and second address signals to the first and second buffers, respectively, to indicate samples to be provided to the audio devices, wherein in a normal operating state, the first address signal is incremented once for each assertion of a sample request signal, and the second address signal is incremented once for every second assertion of the sample request signal.

11. The audio system of claim 10, wherein if a first buffer empty signal is asserted, the control module alternately decrements and increments the first address signal twice.

12. The audio system of claim 11, wherein if a second buffer empty signal is asserted, the control module alternately decrements and increments the second address signal once for every second assertion of the sample request signal.

13. The audio system of claim 12, wherein while a pause signal is asserted, the control module alternately increments and decrements the first address signal.

14. The audio system of claim 13, wherein while the pause signal is asserted, the control module further alternately increments and decrements the second address signal once for every second assertion of the sample request signal.

15. A method for providing a first digital sample sequence concurrently with a decimated digital sample sequence, wherein the method comprises:

buffering the first digital sample sequence in a first buffer;

decimating the first digital sample sequence to produce the decimated digital sample sequence;

buffering the decimated digital sample sequence in a second buffer;

determining a first buffer address signal and a second buffer address signal;

presenting digital samples indicated by the first and second buffer address signals to first and second output ports, respectively;

wherein the determining includes:
- receiving a sample request signal;
- receiving a pause signal;
- receiving first and second buffer empty signals;
- incrementing the first buffer address signal once for each assertion of the sample request signal if the pause signal is de-asserted and the first buffer empty signal is de-asserted; and
- incrementing the second buffer address signal once for every-other assertion of the sample request signal if the pause signal is de-asserted and the second buffer empty signal is de-asserted.

16. The method of claim 15, wherein the determining further includes:

alternately decrementing and incrementing the first buffer address signal for each assertion of the sample request signal at least twice if a first buffer empty signal is asserted.

17. The method of claim 16, wherein the determining further includes:

alternately decrementing and incrementing the second buffer address signal for every-other assertion of the sample request signal if a second buffer empty signal is asserted.

18. The method of claim 17, wherein the determining further includes:

alternately incrementing and decrementing the first buffer address signal for each assertion of the sample request signal while a pause signal is asserted; and alternately incrementing and decrementing the second buffer address signal for every-other assertion of the sample request signal while a pause signal is asserted.

* * * * *